Oct. 16, 1956   K. WILFERT ET AL   2,767,014
ABUTTING PANEL SPACED JOINTS IN AUTOMOBILE BODIES
Filed Oct. 16, 1952
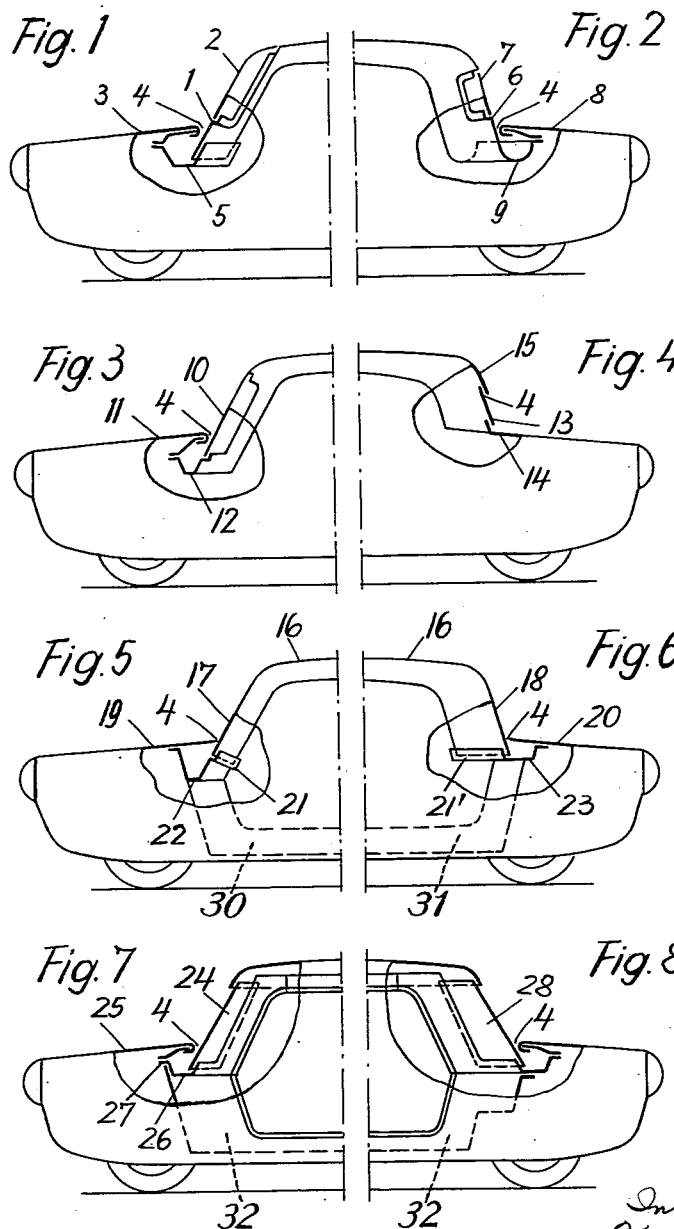

United States Patent Office 2,767,014
Patented Oct. 16, 1956

2,767,014

ABUTTING PANEL SPACED JOINTS IN AUTOMOBILE BODIES

Karl Wilfert, Stuttgart-Degerloch, and Béla Barényi, Stuttgart-Rohr, Germany, assignors to Daimler-Benz Aktiengesellschaft, Stuttgart-Unterturkheim, Germany Application October 16, 1952, Serial No. 314,982

Claims priority, application Germany October 17, 1951

8 Claims. (Cl. 296—28)

The invention relates to bodies of automobiles and is particularly concerned with the formation of the joints in bodies of motor cars.

In connection with bodies of automobiles it is important to have the length and the number of the joints as small as possible, for the manufacture and assembly of the joints increases the production costs of the body. Not only the length or the number of the joints increases the production costs, but also the formation of the joints itself requires a precise and therefore expensive workmanship. The reason for it resides in the fact that the edges of a joint must align exactly and must have the very same distance from one another over the entire length. Otherwise the joint would look very poorly proportioned.

An object of the present invention is to reduce the production costs of a body by a novel formation of certain joints particularly open or exposed joints. Particularly the open or exposed joints should be formed in a novel manner within the range of the windscreen or the rear end screen, where the sheets to be joined do not lie in one plane but meet at an angle, in order to simplify the production and to bring down the costs by giving little thought to the precision of the joining sections.

The present invention resides in the provision of a construction in which two abutting body sections which form a joint therebetween are arranged in such a manner that one body part passes beyond the edge of the other at an angle thereto so that the joint is actually formed between the edge of the one body section and a relatively flat body portion such as a sheet metal member of the other section passing beyond the edge of the one body section. The accuracy necessary for good appearance and the requirement that the edges or the abutting planes must have the very same distance from one another can be dispensed with by such a construction and formation of the joint.

Further features, objects and advantages of the present invention will become more obvious from the following description when taken in connection with the accompanying drawing which shows, for purposes of illustration only, several embodiments in accordance with the present invention and wherein:

Figure 1 is a schematic illustration of a side view of one half of a vehicle in accordance with the present invention with parts removed to show the construction of the joint in accordance with the present invention, and Figures 2 to 8 are schematic illustrations of a side view of other embodiments of one half of a vehicle in accordance with the present invention similar to Figure 1.

The various views illustrated herein may constitute either the front or the rear half of the different vehicles in accordance with the present invention.

Referring now to the drawing and more particularly to Figure 1 which illustrates the front half of a passenger car, the wind screen or window pane 2 is supported in a frame 1. The frame 1 includes a sheet metal part which is advanced or brought forwardly close to the bordered or inturned end of the sheet metal body member 3 such as the hood of the upper body of the vehicle. The wind screen or window pane 2 is disposed essentially transversely to the longitudinal axis of the vehicle at one end of the passenger compartment.

Thus, the joint 4 is formed between the inturned edge of the sheet metal hood member 3 and that portion of the sheet metal frame 1 which is brought forwardly or advanced close to the inturned edge. In that way, the joint 4 is formed between the inturned edge of the sheet metal hood member and an essentially flat surface formed by the part of the sheet metal frame 1 which extends at an angle to the flat sheet metal portions of the hood 3 leading up to the inturned edge thereof.

A sheet metal base member 5 which is suitably connected with the lower end of the sheet metal frame 1 and with the sheet metal body member 3 of the hood forms a rain canal to prevent the water which may flow through the joint 4 from reaching the compartment formed within the hood member 3.

Figure 2 illustrates the rear half of a passenger car. In that figure the frame 6 for the rear window pane 7 which is brought rearwardly close to the inturned edge of the sheet metal body 8 of the rear upper body extends downwardly past the inturned edge of the sheet metal body 8. The joint 4 in that case is again formed between the essentially straight portion of the sheet metal frame 6 and the inturned edge of the sheet metal hood member 8. The rain canal 9 below the body sheet metal member 8 of the hood in that case is formed by the downwardly extended portion of the frame member 6 which is suitably bent into an essentially U-shape at the lower end thereof and connected in any suitable manner with the sheet metal hood member 8.

The window pane 7 in that case also extends essentially transversely to the longitudinal axis of the vehicle at one end of the passenger compartment. Any rain water which may flow past the joint is again kept out of the interior of the compartment formed within the hood member 8 by the rain canal 9.

In the embodiment according to Figure 3 the wind screen or window pane 10 which again extends transversely to the longitudinal axis of the vehicle at one end of the passenger compartment, is lengthened in the downward direction so that it extends below the inturned edge of the sheet metal body member 11 of the hood. In that case, the joint 4 is formed between the inturned edge of the sheet metal body member 11 and the essentially rectilinearly downwardly extended portion of the wind screen or window pane 10. The wind screen or window pane 10 is retained at the bottom thereof in an appropriately shaped sheet metal base member 12 which at the same time forms the rain canal and is connected in any suitable manner with the sheet metal body member 11 of the hood.

Figure 4 illustrates another embodiment for the construction of the rear end window of a passenger car. The rear end window pane 13 which extends transversely to the longitudinal axis of the vehicle at one end of the passenger compartment is mounted at the bottom thereof on the sheet metal body member 14 of the rear end of the vehicle body in any well-known manner. The sheet metal body member 14 forms the outer cover of the vehicle body.

At the top, the window pane 13 extends underneath the roof 15 so that again a joint 4 will result from such a construction in accordance with the present invention.

Figure 5 illustrates the front half and Figure 6 the rear half of a passenger car whose central section which encloses the passenger compartment or space is provided with a hood 16 made of "Plexiglas."

According to Figure 5, the front bottom end 17 of the hood 16 which at the same time forms with a portion thereof the front wind screen or window pane extending transversely to the longitudinal axis of the vehicle is extended past the rear edge of the sheet metal body member 19 forming the front hood.

In Figure 6, the rear lower end 18 of the hood 16 which at the same time with a portion thereof forms the rear window pane extending transversely to the longitudinal axis of the vehicle is extended past the forward edge of the sheet metal body member 20 forming the rear hood.

Thus, in both Figures 5 and 6 the joints 4 are again formed in the same manner as described above, namely between an edge of a sheet metal member of the upper body and an essentially flat surface formed by the downwardly extended portions 17 and 18 of the hood 16.

The bottom ends of the extended portions 17 and 18 of the "Plexiglas" hood 16 are bolted to a sheet metal base member 21 and 21' respectively in both of the embodiments according to Figures 5 and 6. However, with such a sheet metal base member 21 or 21', the bottom ends of the extended portions 17 and 18 may also be riveted to the base member or secured into the base member by means of a forced fit.

In the embodiments according to Figures 5 and 6, the sheet metal foundation or base members 21 and 21' simultaneously constitute the rain canals 22 and 23 respectively. The portions of the sheet metal base members 21 and 21' forming the rain canals 22 and 23 may be supported or secured directly in any conventional manner at the bent end of a, for example, substantially U-shaped frame members 30 and 31 respectively. The rain canals 22 and 23 may be fastened to the end of the frame members 30 and 31 either by means of rigid intermediate members or by being placed upon the upper end of the substantially U-shaped frame members 30 and 31 to which they may be secured directly in any conventional manner.

Figures 7 and 8 illustrate the front and rear section of a motor vehicle respectively.

In Figure 7, the wind screen or window pane 24 which is disposed transversely to the longitudinal axis of the vehicle at one end of the passenger compartment, extends below the inturned edge of the sheet metal hood member 25 of the upper body. In that case, the joint 4 is formed between the rear inturned edge of the sheet metal body member 25 and the front surface of the window pane 24. The rain canal 26 which may be supported or directly secured in any conventional manner to the upper end of a substantially U-shaped vehicle frame 32 is formed by the sheet metal base member 27 which is pressed downwardly and follows the contour of the wind screen or window pane 24 without a shoulder.

In Figure 8, the rear window pane or screen 28 is arranged in a manner similar to the wind screen or window pane 24 of Figure 7 and the rain canal and joint 4 thereof are also formed in a similar manner.

The joints at the top ends of the screens or window panes 24 and 28 in Figures 7 and 8 are also constructed in accordance with the present invention in a manner similar to that illustrated in connection with Figure 4. With such a construction, the great advantage results that the window panes need not be cut accurately at the bottom and at the top thereof. This in turn provides a considerable reduction of the costs connected therewith.

The embodiments for the windscreen and the rear screen described in detail may be exchanged between each other.

The invention is not restricted to the joining of the central section of a vehicle with the end sections of the same, but also applicable to the joining of other parts, particularly to two sheets abutting together in an angular relation to each other. In applying the invention the joining sheets may also be curved or the joints may also take a transverse turn.

What we claim is:

1. In a motor vehicle having an upper body and a frame supporting said body, a window pane in at least one of the two ends of the passenger compartment, said upper body including a sheet metal hood member for the vehicle end adjacent said one end, said window pane being spaced from said sheet metal hood member a substantial distance and being devoid of any direct connection therewith and extending below the upper edge of said hood member to form a gap with said upper edge, a sheet metal base member, and means for fastening the lower end of said window pane to said base member and for fastening said base member directly to said frame.

2. In a motor vehicle having an upper body and frame supporting said body, a window pane in at least one of the two ends of the passenger compartment, said upper body including a sheet metal hood member for the vehicle end adjacent said one end, said window pane being spaced with the outer surface thereof a substantial distance from said sheet metal hood member and being devoid of any direct connection therewith and extending below the upper edge of said hood member to form a gap with said upper edge, a sheet metal base member, means for securing said window pane to said base member and for securing said base member directly to said frame, said window pane forming a part of the upper transparent portion of said passenger compartment.

3. The combination according to claim 1 wherein said base member passes over into a rain canal located underneath said hood-like member.

4. The combination according to claim 1 wherein said base member is formed in part as a rain canal located underneath said hood-like member.

5. In a motor vehicle at least one sheet metal body member having an edge, another member including a window pane disposed transversely to the longitudinal axis of said vehicle and at an angle with respect to said sheet metal member and extending past said edge, said other member being spaced a substantial distance from said sheet metal body member and being devoid of any direct connection therewith thereby forming a gap with said edge, a base member, and means including said base member for directly connecting said body member with the end of said other member extending past said edge.

6. The combination according to claim 5, further comprising a frame for supporting the body of said vehicle, and means for securing said base member to said frame.

7. In a motor vehicle at least one sheet metal body member having an edge, another member including a window pane disposed transversely to the longitudinal axis of said vehicle and at an angle with respect to said body member and extending beyond said edge within said vehicle, said other member being spaced from said sheet metal body member a substantial distance and being devoid of any direct connection therewith so as to form a gap with said edge, a sheet metal base member, and means including said sheet metal base member for directly connecting said other member with said body member.

8. The combination according to claim 7 wherein the last-named means includes water drainaige means.

References Cited in the file of this patent

UNITED STATES PATENTS

| | | |
|---|---|---|
| 2,224,186 | Henri-Labourdette | Dec. 10, 1940 |
| 2,356,976 | Conlon | Aug. 29, 1944 |
| 2,366,092 | Floraday | Dec. 26, 1944 |

FOREIGN PATENTS

| | | |
|---|---|---|
| 477,972 | Canada | Oct. 23, 1951 |
| 541,754 | France | May 6, 1922 |
| 821,821 | France | Sept. 6, 1937 |
| 506,845 | Great Britain | June 6, 1939 |
| 632,116 | Great Britain | Nov. 16, 1949 |